US008080907B2

(12) United States Patent
Jeung

(10) Patent No.: US 8,080,907 B2
(45) Date of Patent: Dec. 20, 2011

(54) ROTOR OF BRUSHLESS (BL) MOTOR

(75) Inventor: Young-Chun Jeung, Cypress, CA (US)

(73) Assignee: Young-Chun Jeung, Cypress, CA (US)

( * ) Notice: Subject to any disclaimer, the term of this patent is extended or adjusted under 35 U.S.C. 154(b) by 359 days.

(21) Appl. No.: 12/102,539

(22) Filed: Apr. 14, 2008

(65) Prior Publication Data

US 2009/0108686 A1    Apr. 30, 2009

(30) Foreign Application Priority Data

Oct. 25, 2007    (KR) .................. 10-2007-0107665

(51) Int. Cl.
*H02K 5/24*    (2006.01)
(52) U.S. Cl. .. 310/51; 310/43; 310/156.08; 310/156.12; 310/156.13
(58) Field of Classification Search ........... 310/51, 310/43, 156.08, 156.12, 156.13
See application file for complete search history.

(56) References Cited

U.S. PATENT DOCUMENTS

| | | | | |
|---|---|---|---|---|
| 2,192,985 A * | 3/1940 | Reis | ........... | 310/156.51 |
| 2,488,729 A * | 11/1949 | Kooyman | ........... | 310/156.23 |
| 3,246,187 A * | 4/1966 | Iemura | ........... | 310/156.21 |
| 3,909,647 A * | 9/1975 | Peterson | ........... | 310/156.12 |
| 4,093,906 A * | 6/1978 | Draxler | ........... | 322/51 |
| 4,587,450 A * | 5/1986 | Ozaki | ........... | 310/156.11 |
| 4,954,736 A * | 9/1990 | Kawamoto et al. | ........... | 310/156.21 |
| 5,200,662 A * | 4/1993 | Tagami et al. | ........... | 310/156.61 |
| 5,237,737 A * | 8/1993 | Zigler et al. | ........... | 29/598 |
| 5,345,130 A * | 9/1994 | Kliman et al. | ........... | 310/156.13 |
| 5,500,994 A * | 3/1996 | Itaya | ........... | 29/598 |
| 5,528,095 A * | 6/1996 | Strobl | ........... | 310/156.12 |
| 6,376,954 B1 * | 4/2002 | Nunes, Jr. | ........... | 310/91 |
| 6,404,086 B1 * | 6/2002 | Fukasaku et al. | ........... | 310/89 |
| 6,462,440 B1 * | 10/2002 | Asao et al. | ........... | 310/51 |
| 7,075,203 B2 * | 7/2006 | Kuwert | ........... | 310/156.13 |
| 2001/0048261 A1 * | 12/2001 | Kojima et al. | ........... | 310/156.13 |
| 2005/0001502 A1 * | 1/2005 | Yamazaki et al. | ........... | 310/156.47 |
| 2006/0113857 A1 * | 6/2006 | Honkura et al. | ........... | 310/156.43 |

FOREIGN PATENT DOCUMENTS

| | | | |
|---|---|---|---|
| GB | 2015266 A | * | 9/1979 |
| JP | 56117567 A | * | 9/1981 |
| JP | 56157249 A | * | 12/1981 |
| JP | 58112449 A | * | 7/1983 |
| JP | 01129741 A | * | 5/1989 |
| JP | 06086485 A | * | 3/1994 |
| JP | 2001268831 A | * | 9/2001 |

\* cited by examiner

*Primary Examiner* — Quyen Leung
*Assistant Examiner* — Alex W Mok
(74) *Attorney, Agent, or Firm* — Staas & Halsey LLP

(57) ABSTRACT

The present invention provides a rotor of a brushless (BL) motor, including: a high-strength engineering plastic member formed by injection-molding high-strength engineering plastic around a concavo-convex portion 12a formed on the outer circumferential surface of a rotary shaft; a sound-absorbing resin element formed by injection-molding a sound-absorbing resin around the high-strength engineering plastic member; a cylindrical ring magnet assembly including a plurality of axially aligned ring-shaped magnets, each of which has a plurality of indented grooves 20a and 20b formed on both end edges of the inner circumferential surface thereof; and a high-strength plastic member formed by injection-molding a high-strength plastic between the sound-absorbing resin element and the ring magnet assembly, the high-strength plastic member having a plurality of protrusions formed on the outer circumferential surface thereof in such a fashion that each protrusion corresponds to an associated one of the indented grooves of the ring-shaped magnets.

3 Claims, 5 Drawing Sheets

ROTOR OF BRUSHLESS (BL) MOTOR

CROSS-REFERENCE TO RELATED APPLICATIONS

This application claims the benefit of Korean Patent Application No. 10-2007-0107665 filed on Oct. 25, 2007 in the Korean Intellectual Property Office, the disclosures of which are incorporated herein by reference.

BACKGROUND

1. Field

One or more embodiments relate to a rotor of a brushless (BL) motor, and more particularly, to such a rotor of a BL motor, which minimizes the transfer of an electromagnetic vibration and a noise to a rotary shaft thereof, and enables a torque of the rotary shaft to be normally transferred to cylindrical ring magnet assembly.

2. Description of the Related Art

In general, a conventional rotor of a BL motor employs a permanent magnet, and is constructed such that a rotary shaft is coupled to a rotor core using a ferromagnetic material or a steel plate so as to form a magnetic circuit structure of a permanent magnet.

Such a motor rotor entails a problem in that when a permanent magnet rotor interacts with a rotating magnetic field of an armature to generate a torque, electromagnetic cogging, torque ripple or vibration due to electromagnetic interaction always occurring in an air gap between the rotor and the armature is directly transferred to the rotary shaft for transmission to another load side or is amplified to thereby induce serious mechanical noises such as resonant noises.

A method may be used in which a sound-absorbing resin such as rubber or silicon resin is interposed between the ferromagnetic core and the rotary shaft to interrupt noise and vibration transferred through the permanent magnet and the ferromagnetic core in order to reduce the vibration and noise of the rotor of a BL motor.

In this case, the ferromagnetic core having a predetermined area is necessary to minimize a resistance of the armature and the magnetic circuit of a C-type permanent magnet.

Further, the use of the ferromagnetic core makes it hard to significantly reduce the weight of the rotor. The ferromagnetic core still serves as a medium for transferring cogging, torque ripple, noise or vibration occurring in the rotor, and thus there is a limitation in interrupting the noise and vibration only using the sound-absorbing resin disposed around the rotary shaft.

In addition, the conventional permanent magnet rotor as constructed above has a shortcoming in that a high-strength adhesive must be used to combine the permanent magnet and the ferromagnetic core and the weight of the rotor is unbalanced in the course of bonding permanent magnets divided into at least two pieces.

Accordingly, an aspect of an embodiment has proposed a rotor of a BL motor in which a cylindrical permanent magnet having a magnetic circuit embedded therein is used to eliminate the need of the ferromagnetic material used for forming a rotor magnetic circuit allowing for passage of a separate magnetic flux of a permanent magnet.

The rotor of a BL motor using the cylindrical ring magnet assembly proposed by an aspect of an embodiment can be applied to a small-capacity motor such as a stepping motor or a micro motor.

However, such a rotor of a BL motor employing the cylindrical ring magnet assembly encounters a problem in that the bonding force between a high-strength engineering plastic member securely mounted around the rotary shaft and a sound-absorbing resin element formed by injection-molding a sound-absorbing resin around the high-strength engineering plastic member is so weak that in case of a power BL motor requiring several tens of W or more, a torque is normally transferred to the rotary shaft or the cylindrical ring magnet assembly to cause the rotary shaft or the cylindrical ring magnet assembly to be idled, thereby making commercialization of the motor is hard.

SUMMARY

Additional aspects and/or advantages will be set forth in part in the description which follows and, in part, will be apparent from the description, or may be learned by practice of the invention.

Accordingly, one or more embodiments provide a rotor of a brushless (BL) motor, which can increase the bonding force between a high-strength engineering plastic member formed by injection-molding a high-strength engineering plastic around a rotary shaft and a sound-absorbing resin element formed by injection-molding a sound-absorbing resin around the high-strength engineering plastic so as to cause a torque of the rotary shaft to be normally transferred to a cylindrical ring-shaped magnet assembly.

An aspect of the embodiment provides a rotor of a brushless (BL) motor, including: a high-strength engineering plastic member 14 formed by injection-molding high-strength engineering plastic around a concavo-convex portion 12a formed on the outer circumferential surface of a rotary shaft 12; a sound-absorbing resin element 16 formed by injection-molding a sound-absorbing resin around the high-strength engineering plastic member 14; a cylindrical ring magnet assembly including a plurality of axially aligned ring-shaped magnets 20, each of which has a plurality of indented grooves 20a and 20b formed on both end edges of the inner circumferential surface thereof; and a high-strength plastic member 18 formed by injection-molding a high-strength plastic between the sound-absorbing resin element 16 and the ring magnet assembly, the high-strength plastic member having a plurality of protrusions formed on the outer circumferential surface thereof in such a fashion that each protrusion corresponds to an associated one of the indented grooves of the ring-shaped magnets, whereby the bonding force between the high-strength plastic member and the ring magnet assembly is increased by the mutual engagement between the indented grooves of the ring-shaped magnets and the protrusions of the high-strength plastic member.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
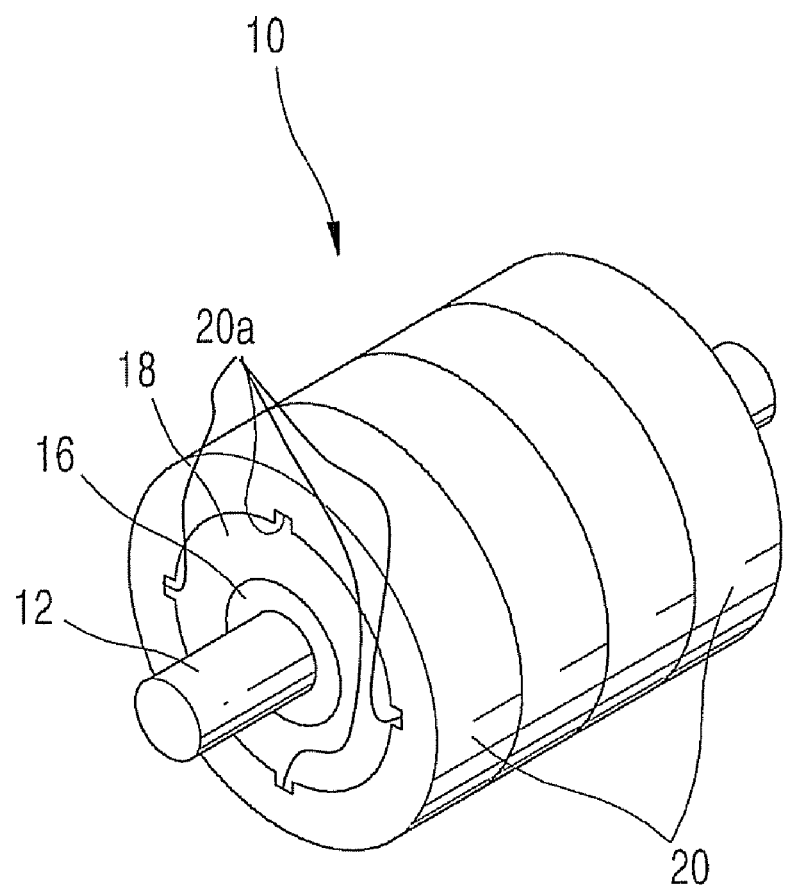
FIG. 1 is an assembled perspective view showing a rotor of a BL motor according to an aspect of the embodiment.

Reference will now be made in detail to the embodiments, examples of which are illustrated in the accompanying drawings, wherein like reference numerals refer to the like elements throughout. The embodiments are described below to explain the present invention by referring to the figures.

Figure 2:
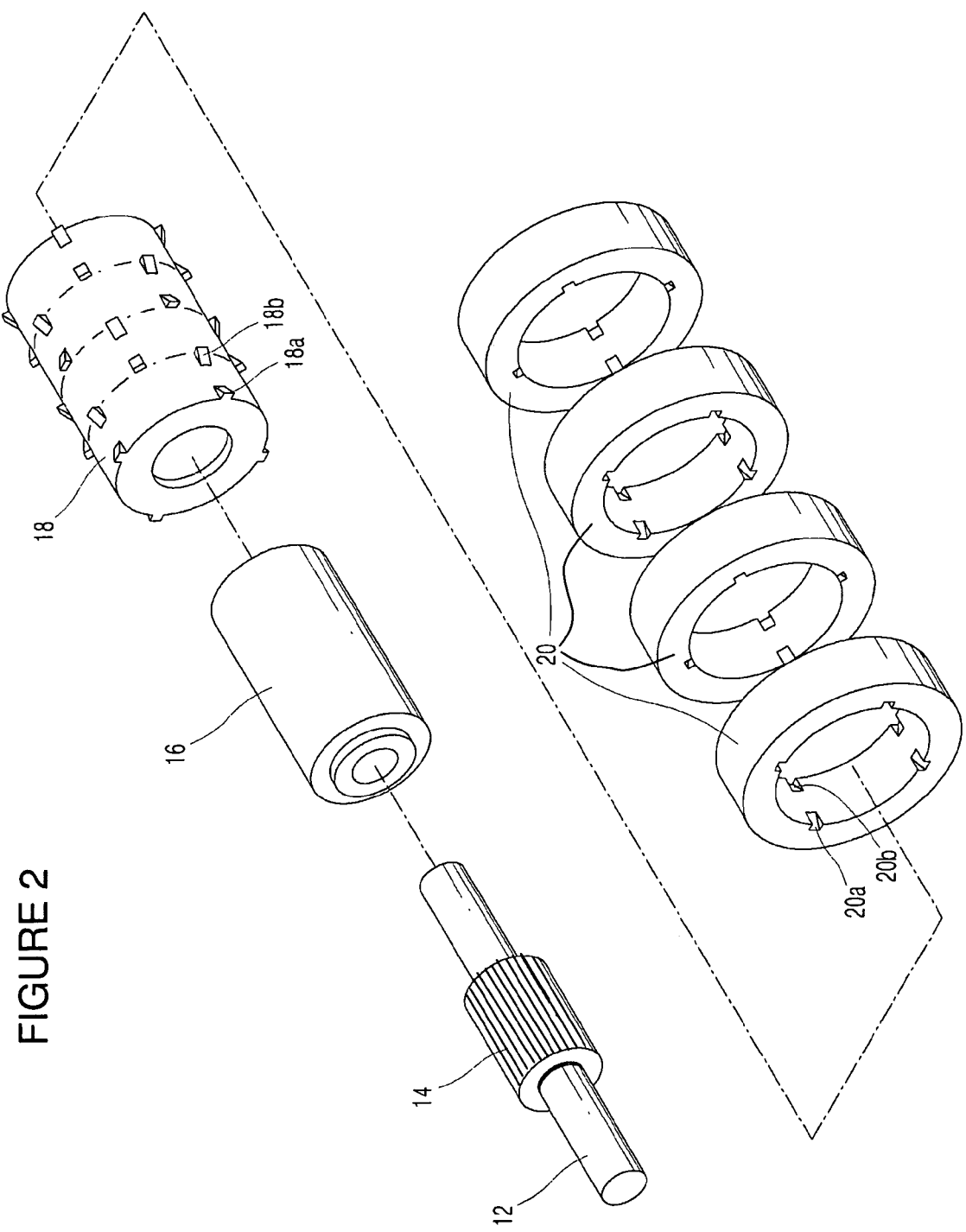
FIG. 2 is an exploded perspective view showing the rotor of a BL motor of FIG. 1.
Figure 3:
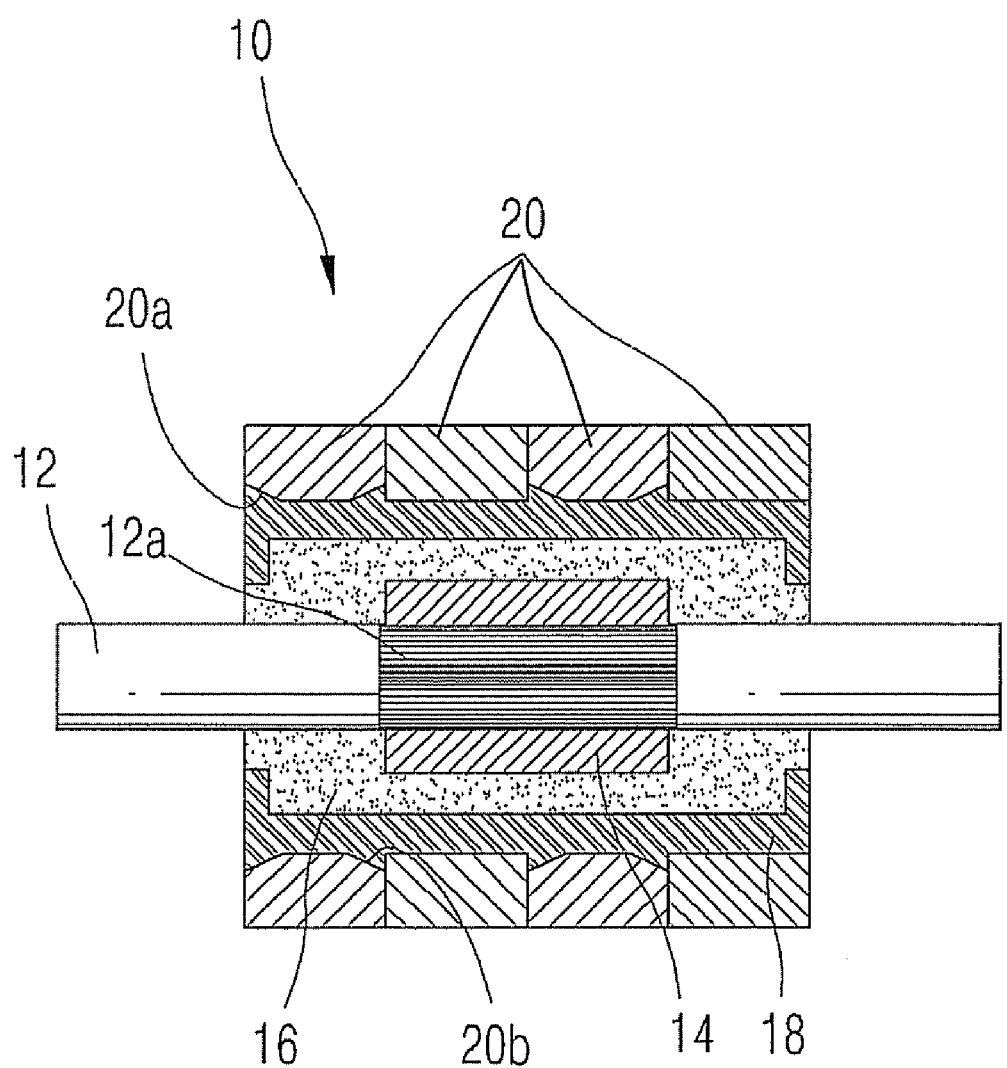
FIG. 3 is a cross-sectional view showing the rotor of a BL motor of FIG. 1.
Figure 4:
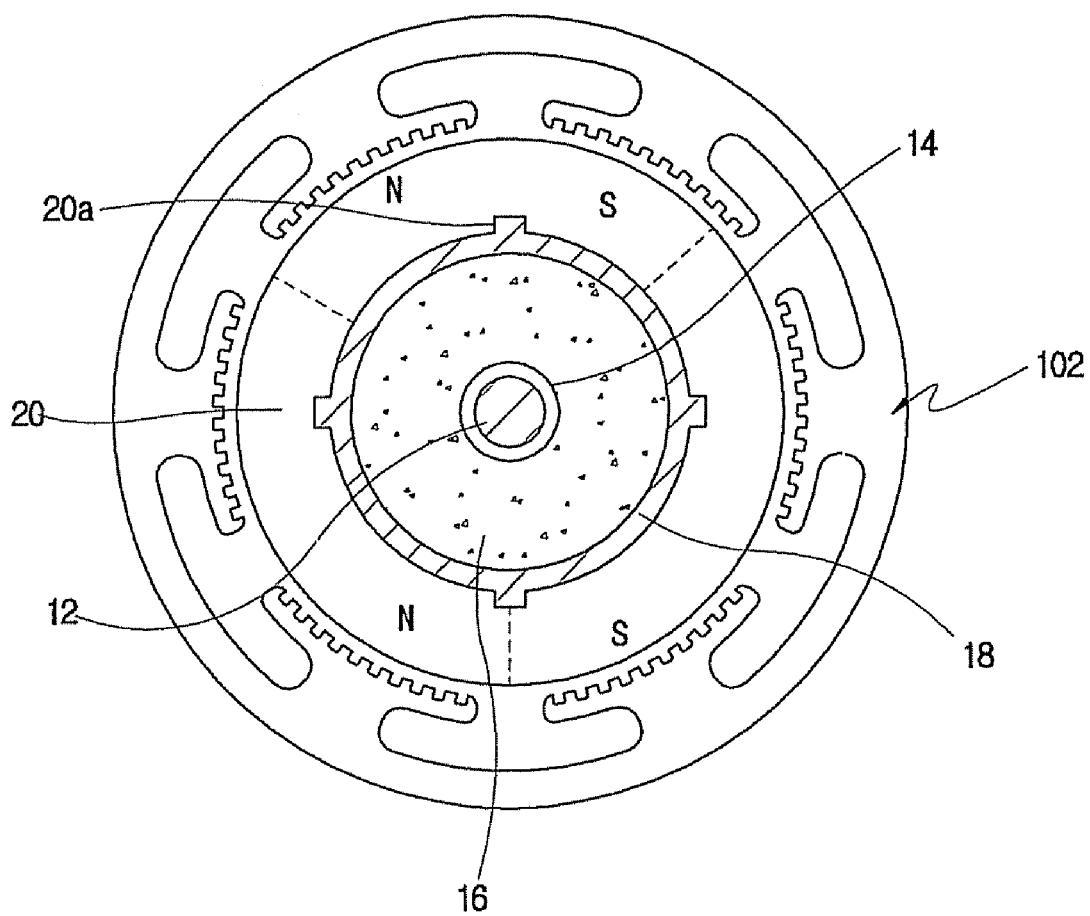
FIG. 4 is a cross-sectional view showing the rotor of a Stepping Motor.
Figure 5:
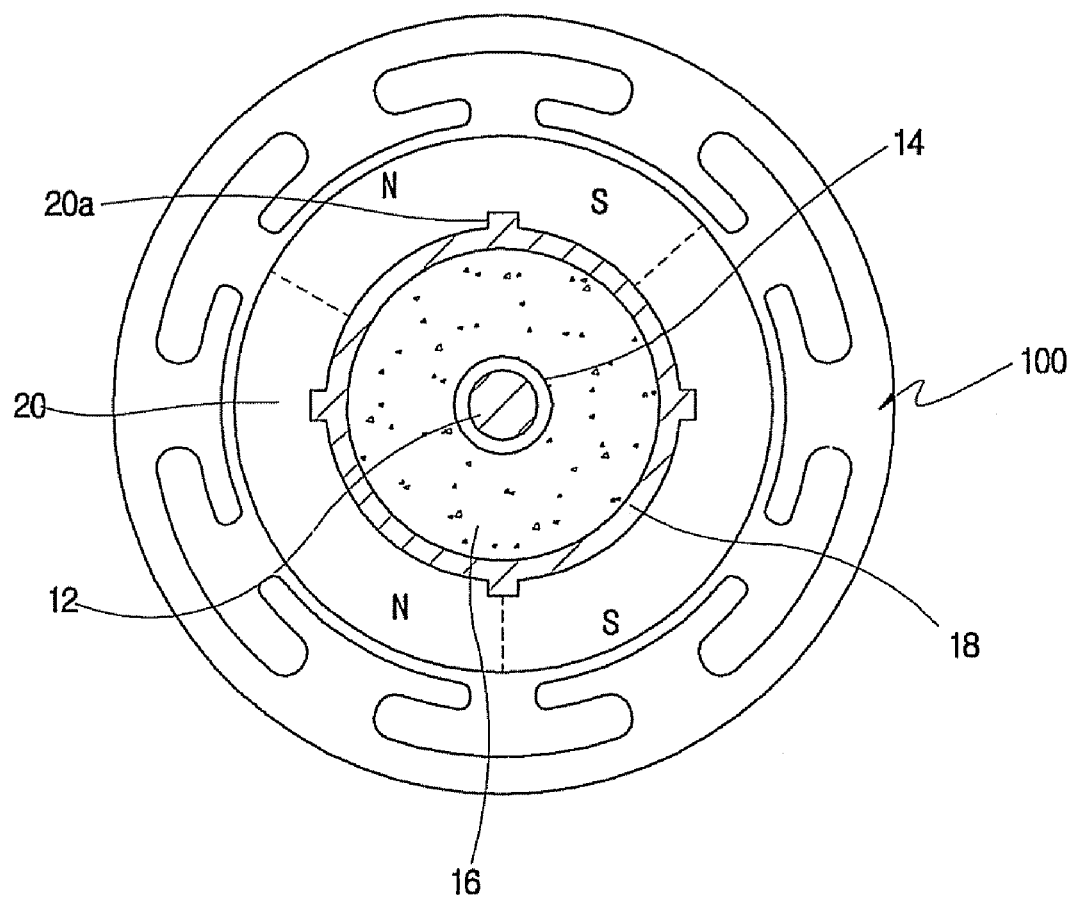
FIG. 5 is a cross-sectional view showing the rotor of a Micro Motor.

FIG. 1 is an assembled perspective view showing a rotor of a BL motor according to an embodiment, FIG. 2 is an exploded perspective view showing the rotor of a BL motor of FIG. 1, FIG. 3 is a cross-sectional view showing the rotor of a BL motor of FIG. 1, FIG. 4 is a cross-sectional view showing the rotor of a Stepping Motor, numeral number 102 denotes stator; and FIG. 5 is a cross-sectional view showing the rotor of a Micro Motor, numeral number 100 denotes stator, according to different aspects of the present invention.

A rotor of a BL motor 10 according to an aspect of the embodiment includes a rotary shaft 12, a high-strength engineering plastic 14, a sound-absorbing resin element 16, a high-strength plastic member 18 and a plurality of axially aligned ring-shaped magnets 20.

The rotor 10 according to an aspect of the embodiment is constructed such that a high-strength engineering plastic member 14 is formed by injection-molding a high-strength engineering plastic around a rotary shaft 12, a sound-absorbing resin element 16 is formed by injection-molding a sound-absorbing resin around the high-strength engineering plastic member 14, and a high-strength plastic member 18 is formed by injection-molding a high-strength plastic between the sound-absorbing resin element 16 and a cylindrical ring magnet assembly including the plurality of axially aligned ring-shaped magnets 20.

The high-strength engineering plastic member 14 is formed by injection-molding a high-strength engineering plastic around the rotary shaft 12 which has been previously machined. At this time, the rotary shaft 12 may have a concavo-convex portion 12a formed on the outer circumferential surface thereof. The concavo-convex portion 12a increases the bonding force between the rotary shaft 12 and the high-strength engineering plastic member 14.

Subsequently, a plurality of concavo-convexes are previously machined on the inner circumferential surface of a mold used in the injection-molding process to form a plurality of concavo-convexes on the outer circumferential surface of the high-strength engineering plastic 14 to increase the bonding force between the injection-molded sound-absorbing resin 16 and the high-strength engineering plastic 14.

The sound-absorbing resin element 16 may be made of a sound-absorbing resin such as rubber or silicon resin.

The high-strength plastic member 18 is formed by injection-molding aluminum, an alloy or a high-strength engineering plastic with a very small thermal expansion coefficient between the outer circumference of the sound-absorbing resin element 16 and the inner circumference of the cylindrical ring magnet assembly.

During the injection-molding process, the cylindrical ring magnet assembly 17 serves as a mold. A plurality of indented grooves 20a and 20b are previously formed on both end edges of the inner circumferential surface of each of the ring-shaped magnets 20 to increase the bonding force between the injection-molded high-strength plastic member 18 and the cylindrical ring magnet assembly.

As described above, when the injection-molding process is completed, a plurality of protrusions 18a and 18b as shown in FIG. 2 may be formed on the outer circumferential surface on the high-strength plastic member 18 in such a fashion as to correspond to the plurality of indented grooves 20a and 20b of the ring-shaped magnets, so that the bonding force between the high-strength plastic member and the ring magnet assembly is increased by the mutual engagement between the indented grooves 20a and 20b of the ring-shaped magnets and the protrusions 18a and 18b of the high-strength plastic member 18 according to an aspect of the embodiment.

The high-strength plastic member 18 employs a high-strength material which is excellent in heat resistance and small in thermal expansion coefficient. The high-strength plastic member 18 is used to prevent damage of the ring-shaped magnets 20 due to its own thermal expansion or the thermal expansion of the sound-absorbing resin element 16.

As described above, the rotor of the embodiment as constructed above prevents the transfer of noise and vibration occurring in an air gap between the armature and the cylindrical ring magnet assembly of the rotor to the rotary shaft 12, and increases the bonding force between the high-strength plastic member 18 and the ring-shaped magnets 20 of the rotor.

While the embodiments have been described with reference to the particular illustrative embodiments, it is not to be restricted by the embodiments but only by the appended claims. It is to be appreciated that those skilled in the art can change or modify the embodiments without departing from the scope and spirit of the embodiments.

What is claimed is:

1. A rotor of a brushless (BL) motor, comprising:
   a concavo-convex portion formed around a rotary shaft;
   a first high-strength engineering plastic member formed by injection molding on the concavo-convex portion;
   a sound-absorbing resin element formed by injection-molding around the first high-strength engineering plastic member;
   a ring-shaped magnet disposed on the outer side of the sound-absorbing resin element; and
   a second high-strength plastic member formed by injection molding between the sound-absorbing resin element and the ring magnet to prevent damage of the ring-shaped magnet due to the thermal expansion of the sound-absorbing resin element;
   wherein a plurality of concavo-convexes are formed on the outer circumferential surface of the first high-strength engineering plastic member to increase the bonding force between the first high-strength engineering plastic member and the sound-absorbing resin element, and indented grooves are formed on the inner circumferential surface of the ring-shaped magnet to be engaged with protrusions formed on the outer circumferential surface of the second high-strength plastic member to increase the bonding force between the second high-strength plastic member and the ring-shaped magnet.

2. A stepping motor having the rotor of claim 1.

3. A micro motor having the rotor of claim 1.

* * * * *